US008655535B2

(12) United States Patent
Oh et al.

(10) Patent No.: US 8,655,535 B2
(45) Date of Patent: Feb. 18, 2014

(54) ELECTRIC VEHICLE AND METHOD FOR CONTROLLING SAME

(75) Inventors: Na Mi Oh, Siheung-si (KR); Sang Min Park, Seoul (KR); Gon Hong Min, Incheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/809,137

(22) PCT Filed: Jul. 8, 2011

(86) PCT No.: PCT/KR2011/005038
§ 371 (c)(1),
(2), (4) Date: Jan. 8, 2013

(87) PCT Pub. No.: WO2012/005554
PCT Pub. Date: Jan. 12, 2012

(65) Prior Publication Data
US 2013/0116875 A1    May 9, 2013

(30) Foreign Application Priority Data

Jul. 9, 2010 (KR) .................. 10-2010-0066342
Jan. 12, 2011 (KR) .................. 10-2011-0003172
Jan. 12, 2011 (KR) .................. 10-2011-0003173

(51) Int. Cl.
*B60L 3/12*    (2006.01)

(52) U.S. Cl.
USPC ............................................... 701/22; 701/43

(58) Field of Classification Search
None
See application file for complete search history.

(56) References Cited

U.S. PATENT DOCUMENTS

| 6,356,424 | B1* | 3/2002 | Myong et al. ................. 361/93.7 |
| 7,518,261 | B2* | 4/2009 | Sugimura et al. ............. 307/10.6 |
| 7,688,023 | B2* | 3/2010 | Yoon et al. ..................... 320/104 |
| 2010/0094496 | A1* | 4/2010 | Hershkovitz et al. ........... 701/22 |

FOREIGN PATENT DOCUMENTS

| KR | 10-2003-0039496 A | 5/2003 |
| KR | 10-2008-0047055 A | 5/2008 |
| KR | 10-2008-0095311 A | 10/2008 |
| KR | 10-2009-0012456 A | 2/2009 |

OTHER PUBLICATIONS

English machine translation of Korean Unexamined Patent Application 10-2008-0047055, application date Nov. 24, 2006, publication date May 28, 2008.*
International Search Report from related PCT Application No. PCT/KR2011/005038.

* cited by examiner

*Primary Examiner* — Helal A Algahaim
*Assistant Examiner* — Rebecca Wagner
(74) *Attorney, Agent, or Firm* — McKenna Long & Aldridge (57) ABSTRACT

The present invention relates to an electric vehicle and a method for controlling same, which involve monitoring the state of PRA which switches power supply so as to stably supply power or cut off the supply of power during the operation of the electric vehicle, and controlling of a plurality of switches for supplying power from a battery or cutting off the result of the switching, thus enabling the accurate control of switching and preventing an erroneous operation.

23 Claims, 8 Drawing Sheets

ELECTRIC VEHICLE AND METHOD FOR CONTROLLING SAME

TECHNICAL FIELD

The present invention relates to an electric vehicle and a method for controlling the same, and more particularly to an electric vehicle for monitoring a state of a switching unit, and stably supplying or cutting off charged power through correct switching control.

BACKGROUND ART

Electric vehicles (EVs) have been actively studied because they are the most promising solution to pollution and energy problems.

Electric vehicles (EVs) are mainly powered by driving an AC or DC motor using battery power. Electric vehicles are broadly classified into battery powered electric vehicles and hybrid electric vehicles. In the battery powered electric vehicles, a motor is driven using power of a battery, and the battery is recharged after stored power is completely consumed. In hybrid electric vehicles, a battery is charged with electricity generated via engine driving, and an electric motor is driven using the electricity to realize vehicle movement.

The hybrid electric vehicles may further be classified into serial type ones and parallel type ones. In the case of serial hybrid electric vehicles, mechanical energy output from an engine is changed into electric energy via a generator, and the electric energy is fed to a battery or motor. Thus, the serial hybrid electric vehicles are always driven by a motor similar to conventional electric vehicles, but an engine and generator are added for the purpose of increasing range. Parallel hybrid electric vehicles may be driven using two power sources, i.e. a battery and an engine (gasoline or diesel). Also, the parallel hybrid electric vehicles may be driven using both the engine and the motor according to traveling conditions.

With recent development of motor/control technologies, small high-output and high-efficiency systems have been developed. By replacing a DC motor with an AC motor, electric vehicles have accomplished considerably enhanced output and power performance (acceleration performance and maximum speed) comparable to those of gasoline vehicles. As a result of promoting a higher output and higher revolutions per minute, a motor has achieved reduction in weight and size, and consequently reduction in the weight and size of a vehicle provided with the motor.

A battery of the electric vehicle is charged with power and the vehicle starts driving using the battery power, such that it is necessary to stably supply the current charged in the battery to the vehicle as soon as the vehicle starts driving.

In order to supply or cut off the current charged in the battery, the electric vehicle includes a plurality of relays serving as a switching unit. If the plurality of relays serving as the switching unit abnormally operates, an unexpected problem may occur in power supply or power cutoff.

Specifically, the relays may be damaged by heat caused by overcurrent such that an unexpected problem may occur in supply of power acting as the principal power source of the electric vehicle. In order to check whether any of the relays is damaged, a user must detach some components from the electric vehicle, resulting in great inconvenience.

Consequently, there is a need to develop a method for enabling the electric vehicle to check a switching state as well as to perform correct switching.

DISCLOSURE

Technical Problem

Therefore, the present invention has been made in view of the above problems, and an object of the present invention is to provide an electric vehicle that controls a plurality of relays when supplying current charged in the battery of the electric vehicle and at the same time checks a state of each relay so as to easily recognize whether any of the relays is damaged, such that power supply is stably achieved or cut off.

Technical Solution

In accordance with one aspect of the present invention, the above and other objects can be accomplished by an electric vehicle comprising: a battery for charging a high-voltage operating power therein, and providing the charged power; a battery management system (BMS) for managing a state of the battery in response to the charging of the battery or the operating power supplied from the battery; a motor control unit (MCU) for controlling a motor; a power relay assembly (PRA) including a plurality of relays and resistors, configured to perform switching of the relays in such a manner that the operating power of the battery is supplied to the vehicle according to whether the plurality of relays are operated; and a vehicle control module (VCM) for stepwise-operating the plurality of relays contained in the power relay assembly (PRA) in response to a state of the power relay assembly (PRA) and sensed data, controlling supply of the operating power from the battery, controlling vehicle traveling using the operating power, and checking an operation state of the plurality of relays.

In accordance with another aspect of the present invention, an electric vehicle comprises: a battery for charging a high-voltage operating power therein, and providing the charged power; a power relay assembly (PRA) including a plurality of relays, configured to perform switching of the relays in such a manner that the operating power of the battery is supplied to the vehicle according to whether the plurality of relays are operated; and a vehicle control module (VCM) for controlling vehicle traveling, persistently determining whether the plurality of relays contained in the power relay assembly (PRA) are normally operated through a PRA diagnosis mode during the vehicle traveling, performing a PRA check mode when at least one of the plurality of relays is operated, and diagnosing a state of the power relay assembly (PRA) by testing the plurality of relays of the power relay assembly (PRA).

In accordance with another aspect of the present invention, a method for operating an electric vehicle comprises: operating, by a vehicle control module (VCM), if the vehicle starts driving, a first main contact relay contained in a power relay assembly (PRA) in response to state information of a battery management system (BMS), and connecting the battery and a negative(−) terminal of a motor control unit (MCU); if the first main contact relay normally operates, operating a precharge relay connected to a positive(+) terminal of the battery, and connecting the battery to a positive(+) terminal of the motor control unit (MCU) through a predetermined-sized precharge resistor; if a voltage received from the motor control unit (MCU) is equal to or higher than a predetermined voltage value, operating the second main contact relay connected in parallel to the precharge relay, and connecting the battery to the motor control unit (MCU) through a second main contact relay; and if the second main contact relay normally operates, finally connecting the battery to the motor control unit (MCU) by turning off the precharge relay.

In accordance with another aspect of the present invention, a method for controlling an electric vehicle comprises: sequentially operating a plurality of relays contained in a power relay assembly (PRA) interconnecting a battery and a motor control unit (MCU) so as to provide an operating power; providing the operating power having a voltage reduced by a precharge resistor contained in the power relay assembly (PRA) to the motor control unit (MCU); monitoring whether the power relay assembly (PRA) is damaged by measuring a temperature of the precharge resistor through a resistor temperature sensor; and if the power relay assembly (PRA) normally operates, supplying the operating power of a normal voltage from the battery to the motor control unit (MCU).

In accordance with another aspect of the present invention, a method for controlling an electric vehicle comprises: checking a pre-stored traveling record when the vehicle starts driving; if a power relay assembly (PRA) diagnosis failure record does not exist in the traveling record, establishing a PRA diagnosis mode, performing normal traveling of the vehicle simultaneously while monitoring a state of the power relay assembly (PRA), and storing a monitoring result of the power relay assembly (PRA) state in the traveling record; and if the PRA diagnosis failure record exists in the traveling record, establishing a power relay assembly (PRA) check mode to check a state of a plurality of relays contained in the power relay assembly (PRA) as well as to determine the presence or absence of a malfunction in the relays, thereby diagnosing the PRA state.

Advantageous Effects

The electric vehicle and a method for operating the same according to the embodiments of the present invention have the following effects. When battery power is supplied to the electric vehicle or is cut off, a plurality of relays are sequentially driven, and operations states of the relays are monitored, so that the relays for determining power supply or cutoff can be correctly switched. As a result, the embodiment prevents unnecessary power consumption, prevents high-voltage power from being abruptly supplied to the electric vehicle or from being cut off, such that power supply and cutoff operations can be stably carried out, resulting in increased product reliability.

In addition, the embodiment receives feedback information of the switching result of the relays, and checks the received feedback information, such that the relays can be correctly switched, a malfunction caused by abnormal power supply is prevented from being generated, a state of each relay can be diagnosed through testing, and a user can easily determine whether a relay is destroyed without detaching components from the electric vehicle.

BEST MODE

Hereinafter, an electric vehicle and a control method thereof according to the exemplary embodiments of the present invention will be described with reference to the accompanying drawings.

Figure 1:
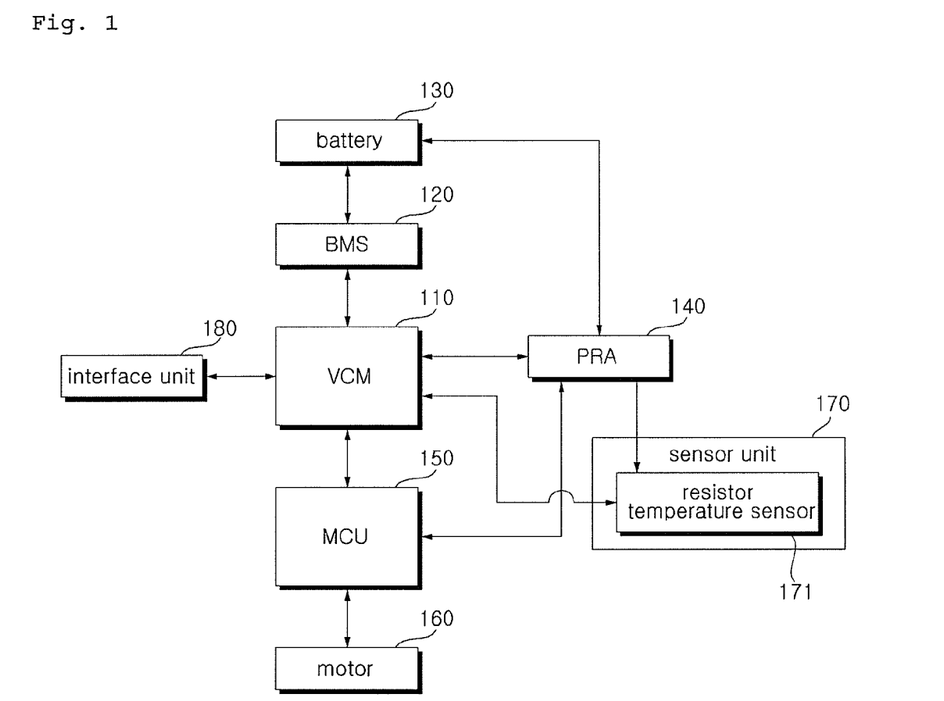
FIG. 1 is a block diagram illustrating constituent components of an electric vehicle according to an embodiment of the present invention.

FIG. 1 is a block diagram illustrating constituent components of an electric vehicle according to an embodiment of the present invention.

Referring to FIG. 1, the electric vehicle according to an embodiment of the present invention includes a battery 130, a battery management system (BMS) 120, a power relay assembly (PRA) 140, a sensor unit 170, an interface unit 180, a motor 160, a motor control unit (MCU) 150, and a vehicle control module (VCM) 110 configured to control vehicle traveling and overall operations of the vehicle.

The interface unit 180 includes an input unit to input predetermined signals via operation of a driver, an output unit to output information on the current operating state of the electric vehicle to the outside, and a manipulation unit for allowing a vehicle driver to input a command for vehicle control.

The output unit includes a display for displaying information; a speaker for outputting music, sound effects, and warning sounds; and various state indicator lamps, for example, a turn signal, a tail lamp, a head lamp, and state indicator lamps installed inside the vehicle so as to inform a vehicle driver of a vehicle state.

The input unit handled by the vehicle driver includes a plurality of switches and a plurality of buttons to control functions of vehicle. In addition, the input unit includes a steering wheel, an accelerator, and a brake.

The battery 130 includes a plurality of high-voltage battery cells, receives power from a charging station, a vehicle charging installation, a home or an external part.

The electric vehicle further includes a battery management system (BMS) 120. The BMS 120 determines if the battery 130 needs to be charged with power by checking the remaining battery capacity of the battery 130, and performs a management operation for providing the charging current stored in the battery to each part of the electric vehicle.

When charging and using the battery, the BMS 120 maintains a regular voltage difference between cells of the battery, and controls the battery not to be overcharged or overdischarged, resulting in increased battery lifespan.

The BMS 120 performs management of the use of the current so as to perform long-time traveling of the vehicle, and includes a protection circuit for a supplied current.

The power-supply unit (not shown) includes a connection terminal or a connection circuit for connecting the electric vehicle to the charging station. If the electric vehicle is connected to an external power source, a charging current is applied to the battery 130 under the control of the BMS 120, such that the battery 130 is charged with power. In addition, the power-supply unit changes the operating power charged in the battery to a power source available to each component of the vehicle, such that the changed power source can be supplied to each component of the vehicle. In this case, the electric vehicle may further include a separate charger, or a converter or inverter for converting received power to necessary power.

Upon receiving a control command from the controller (denoted by VCM) 110, the motor control unit (MCU) 150 generates a control signal for driving at least one motor 160, and outputs the control signal to the motor 160. In addition, the MCU 150 changes high-voltage power charged in the battery 130 according to motor characteristics, and provides the changed power to the motor 160.

A power relay assembly (PRA) 140 is a switching unit for switching a high voltage, includes a plurality of relays and sensors, and provides or cuts off supply of high-voltage power received from the battery 130 to a specific position.

Specifically, when the electric vehicle starts driving, the PRA 140 sequentially controls a plurality of relays to prevent a high-voltage power from being suddenly applied to the electric vehicle, such that a power source can be stably supplied to the electric vehicle. When the electric vehicle stops moving, the PRA 140 sequentially controls the relays so as to prevent power supply.

The sensor unit 170 includes a plurality of sensors inside and outside the vehicle, such that it can input a variety of sense signals. The sensor unit 170 detects signals generated when the vehicle runs or performs a predetermined operation, and inputs the detected signals to the controller (VCM) 110. In this case, different types of sensors may be used according to installation positions.

Specifically, the sensor unit 170 includes a resistor temperature sensor 171 for measuring a temperature of the PRA 140. The resistor temperature sensor 171 measures a temperature of a predetermined resistor contained in the PRA 140, and outputs the measured temperature to the controller (VCM) 110.

The controller (VCM) 110 generates a predetermined command to perform a predetermined operation in response to input signals of the interface unit 180 and the sensor unit 170, and displays an operation state by controlling input/output (I/O) operations of data.

In addition, the controller 110 manages the battery 130 using the BMS 120, and applies a switching signal to the PRA 140 such that supplying or cutting off power to a specific position (component) is controlled by the switching signal.

The controller (VCM) 110 monitors a current state of the PRA 140 in response to a temperature value received from the resistor temperature sensor 171 of the sensor unit 170, and determines whether the PRA 140 is damaged.

If a temperature of the PRA 140 is equal to or higher than a reference temperature, the controller (VCM) 110 enables the interface unit 180 to output a warning message for preventing the PRA 140 from being damaged. Alternatively, the controller (VCM) 110 may limit the operations of the vehicle as necessary.

Figure 2:
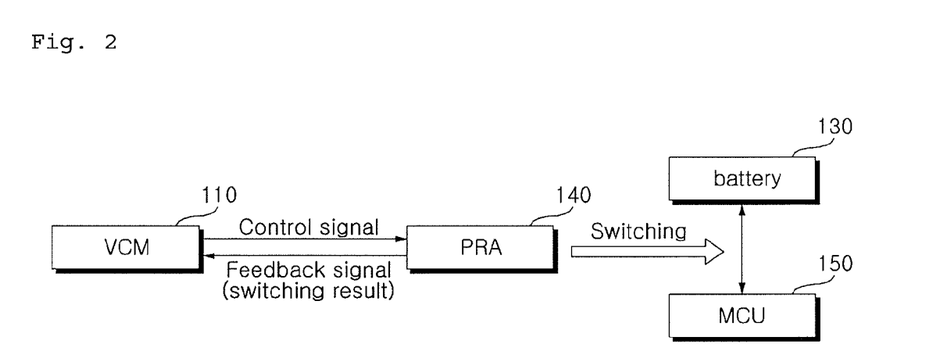
FIG. 2 is a conceptual diagram illustrating a method for controlling an electric vehicle shown in FIG. 1.

FIG. 2 is a conceptual diagram illustrating a method for controlling an electric vehicle shown in FIG. 1. Referring to FIG. 2, the controller (VCM) 110 outputs a control signal to the PRA 140, and controls a plurality of relays contained in the PRA 140.

The relays of the PRA 140 are sequentially switched in response to a control signal from the controller (VCM) 110, the PRA 140 outputs the switching result serving as a feedback signal to the controller (VCM) 110.

If the relays of the PRA 140 are switched, power charged in the battery 130 is applied to the MCU 150 so that the motor starts operating.

In this case, the controller (VCM) 110 compares a control signal applied to the PRA 140 with a feedback signal received from the PRA 140 using a PRA diagnostic mode, such that it determines whether switching control has been normally performed.

The VCM 110 includes a check list in a traveling history, and stores the resultant traveling history, and checks a PRA state of a previous traveling action on the basis of a traveling record whenever the electric vehicle starts driving. If a control signal applied to the PRA 140 is different from a feedback signal received from the PRA 140, it is determined whether a plurality of relays of the PRA 140 are normally switched through a PRA check mode, such that the vehicle can normally operate only when the relays are normally switched.

Figure 3:
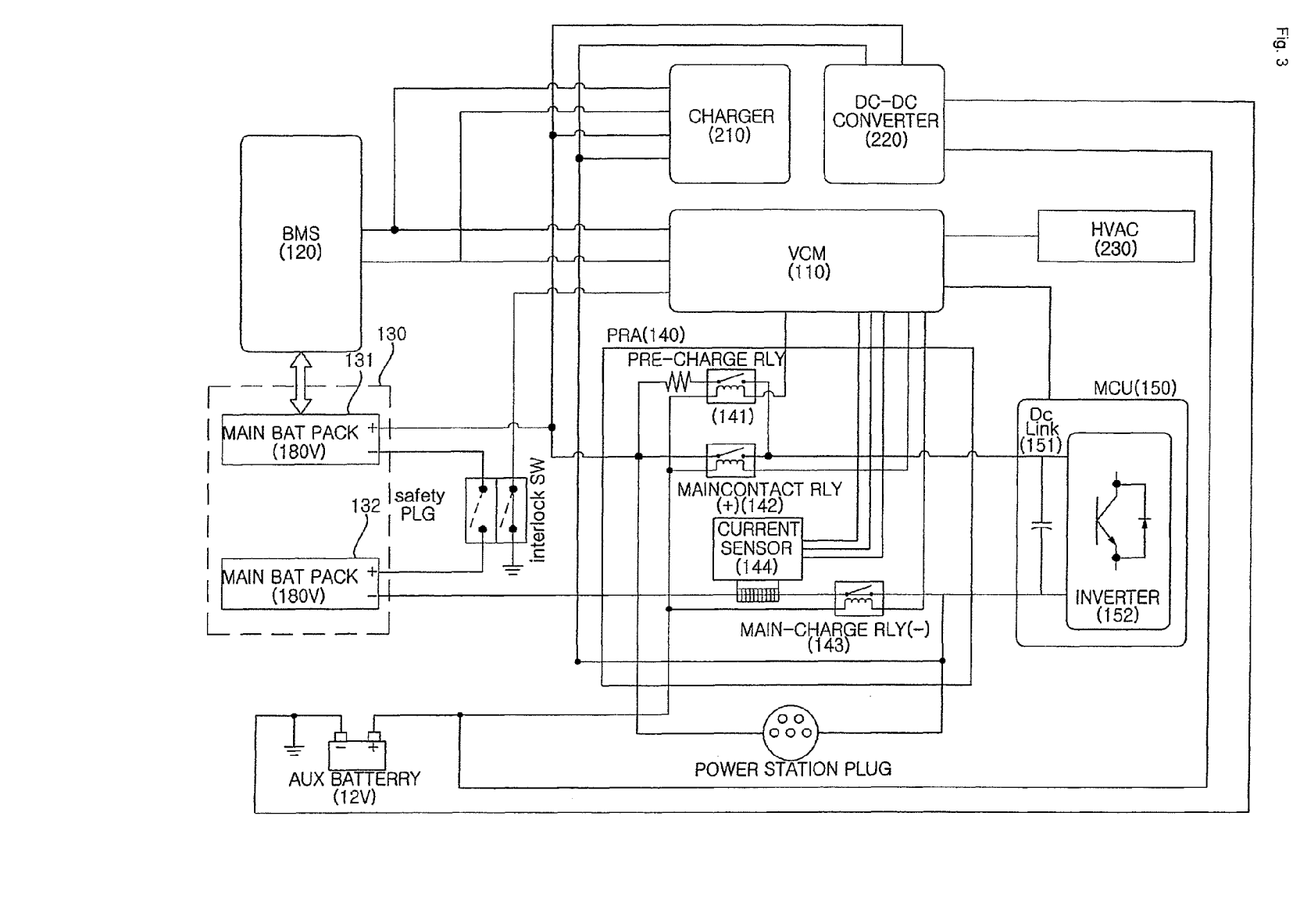
FIG. 3 is a detailed circuit diagram illustrating a vehicle circuit module (VCM) and a power relay assembly (PRA) of the electric vehicle shown in FIG. 1.

FIG. 3 is a detailed circuit diagram illustrating a vehicle circuit module (VCM) and a power relay assembly (PRA) of the electric vehicle shown in FIG. 1.

Referring to FIG. 3, the PRA 140 is connected to the MCU 150, a vehicle control module (VCM) 110, a battery 130, a DC-DC converter 220, and a charger 210. Here, the PRA 140 provides battery power by switching the relays according to a control signal of the VCM 110.

The PRA 140 includes a plurality of relays and sensors. Specifically, the PRA 140 includes a first main contact relay (−) 143, a second main contact relay(+) 142, a pre-charge relay 141, and a current sensor 144. In this case, the pre-charge relay 141 is connected in series to a precharge resistor.

The PRA 140 switches a plurality of relays in response to an output signal of the VCM 110. Particularly, if the vehicle starts or stops driving, the PRA 140 switches the relays according to a predetermined order, such that high-voltage power charged in the battery 130 can be applied to individual components of the vehicle.

The first main contact relay(−) 143 is connected to a power station plug 141 and the VCM 110, is connected to an inverter 152 and a DC-link terminal 151 of the MCU 150, and is also connected to a charger 210, a DC-DC converter 220 and a negative(−) terminal of the battery 130.

The second main contact relay(+) 142 is connected to the VCM 110 and the pre-charge relay 142, and is also connected to a positive(+) terminal of the battery 130, the inverter 152 of the MCU 150, the charger 210 and a positive(+) terminal of the DC-DC converter 220.

Each of the pre-charge relay 141 and the current sensor 144 is connected to the VCM 110.

The pre-charge relay 141 is connected to a precharge resistor of a predetermined size and is connected in parallel to the second main contact relay(+) 142, thereby forming a bypass line for the second main contact relay(+) 142.

The current sensor 144 is connected to a line to which the negative(−) terminal of the battery 130 and the first main contact relay(−) 143 are connected, such that it measures a current flowing in the line.

In this case, individual relays and sensors of the PRA 140 are interconnected.

The BMS 120 is connected to the battery 130, the charger 210, the DC-DC converter 220, and the VCM 110. As described above, the VCM 110 is connected to the BMS 120, the PRA 140, the charger 210, the DC-DC converter 220, a heating ventilation air-conditioning (HVAC) unit 230, and the MCU 150.

The VCM 110 generates a predetermined signal on the basis of state information of each connected part. Specifically, the VCM 110 outputs a switching signal to the PRA 140 in response to state information and a measured current of the BMS. In addition, the VCM 110 outputs a wake-up signal to the MCU 150 and the HVAC 230.

In this case, the first main contact relay 143 is connected to the VCM 110 through a first connection line, and is connected to the VCM through a second connection line. If the first main contact relay 143 or the second main contact relay 142 is turned on, a voltage applied to each relay is input to the VCM 110.

The VCM 110 checks whether the first main contact relay 143 or the second main contact relay 142 is turned on or off on the basis of a voltage value applied to the first or second line.

The charger 210 and the DC-DC converter 220 receive the operating power of the battery 130 in response to relay switching of the PRA 140 and perform a predetermined operation in response to control signals of the BMS 120 and the VCM 110.

Figure 4:
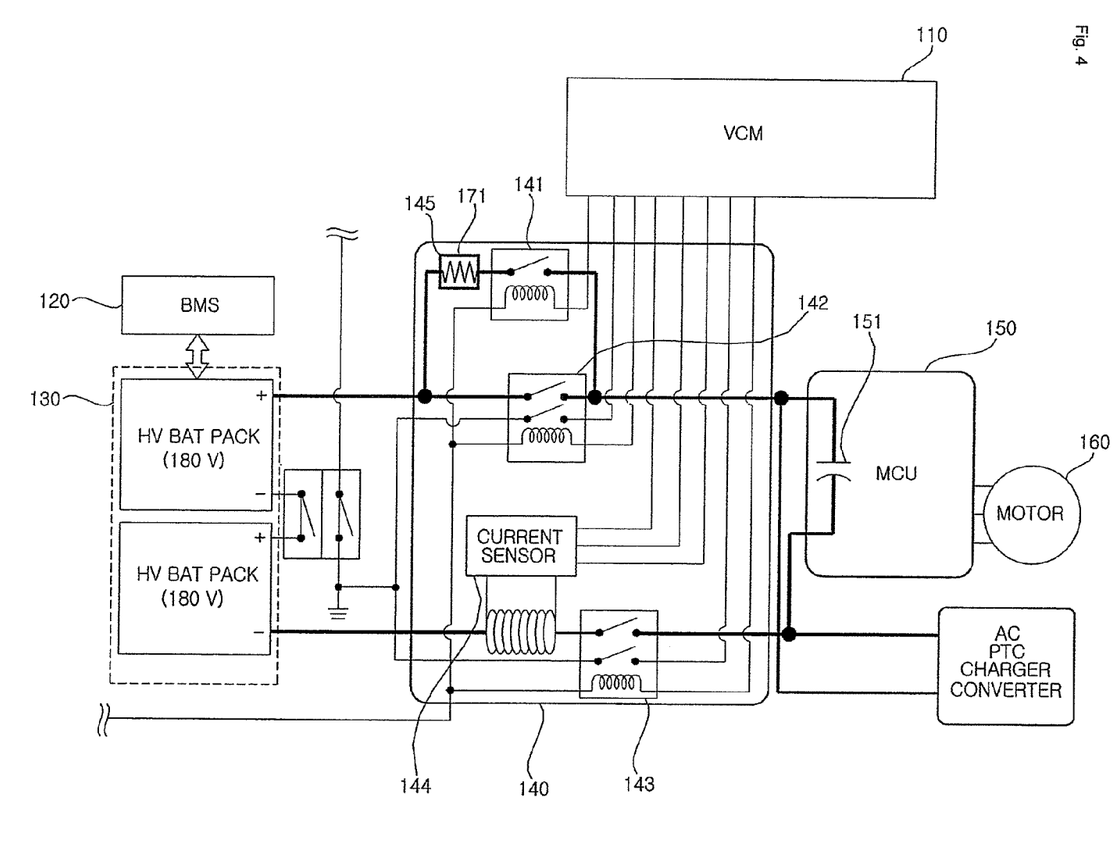
FIG. 4 is a circuit diagram illustrating constituent and connection states of the power relay assembly (PRA) under the control of the electric vehicle shown in FIG. 1.

FIG. 4 is a circuit diagram illustrating constituent and connection states of the power relay assembly (PRA) under the control of the electric vehicle shown in FIG. 1.

Referring to FIG. 4, the precharge resistor 145 includes a resistor temperature sensor 171 of the sensor unit 170. The resistor temperature sensor 171 measures a temperature of the precharge resistor 145, and inputs the measured temperature to the controller 110. Preferably, the resistor temperature sensor 171 may be installed at a surface of the precharge resistor 145.

The current sensor 144 is connected to a line where the negative(−) terminal of the battery 190 is connected to the first main contact relay(−) 143, such that it measures a current flowing in the line.

In this case, relays and sensors contained in the PRA 140 are interconnected.

The VCM 110 generates a predetermined signal on the basis of state information of each connected part. Specifically, the VCM 110 outputs a switching signal to the PRA 140 in response to state information and a measured current of the BMS 120.

In this case, each of the first main contact relay and the second main contact relay of the PRA 140 is connected to the VCM 110 through a separate connection line, and is operated in response to a switching control signal received from each controller 110. If each relay is turned on, a predetermined voltage acting as a feedback signal is input to the VCM 110.

The VCM 110 checks whether the first main contact relay or the second main contact relay is turned on or off in response to an input voltage value.

The PRA 140 switches a plurality of relays in response to an output signal of the VCM 110. Particularly, if the vehicle starts or stops driving, the PRA 140 switches the relays according to a predetermined order, such that a high-voltage power source charged in the battery 130 can be supplied or not supplied to individual components of the vehicle.

The precharge relay 141 provides a reduced voltage before the second main contact relay 142 is turned on, such that it prevents the MCU 150 of the electric vehicle driven by a high voltage from being damaged by a rapidly increasing voltage.

If overcurrent occurs in the vehicle due to load generated from components installed in the vehicle before the second main contact relay 142 is turned on, the precharge relay 141 may be damaged by high heat.

If the precharge relay 141 is turned on, a voltage is applied to a connected precharge resistor 145 such that a temperature of the precharge resistor 145 increases. If overcurrent occurs, such overcurrent is also applied to the precharge resistor 145 so that a temperature of the precharge resistor 145 rapidly increases.

The VCM 110 receives a temperature value of the precharge resistor 145 from the resistor temperature sensor installed at the precharge resistor 145, and determines whether the precharge relay 141 is damaged on the basis of the temperature of the precharge resistor 145.

If the temperature measured by the resistor temperature sensor 171 is equal to or higher than a reference temperature before the second main contact relay 142 is turned on, the VCM 110 determines that the PRA 140 has been damaged, such that it outputs a warning message or sound. If the measured temperature is lower than the reference temperature before the second main contact relay 142 is turned on, the VCM 110 turns on the second main contact relay 142 in response to a voltage level applied to the MCU 150, so that a normal voltage can be supplied to the electric vehicle.

Figure 5:
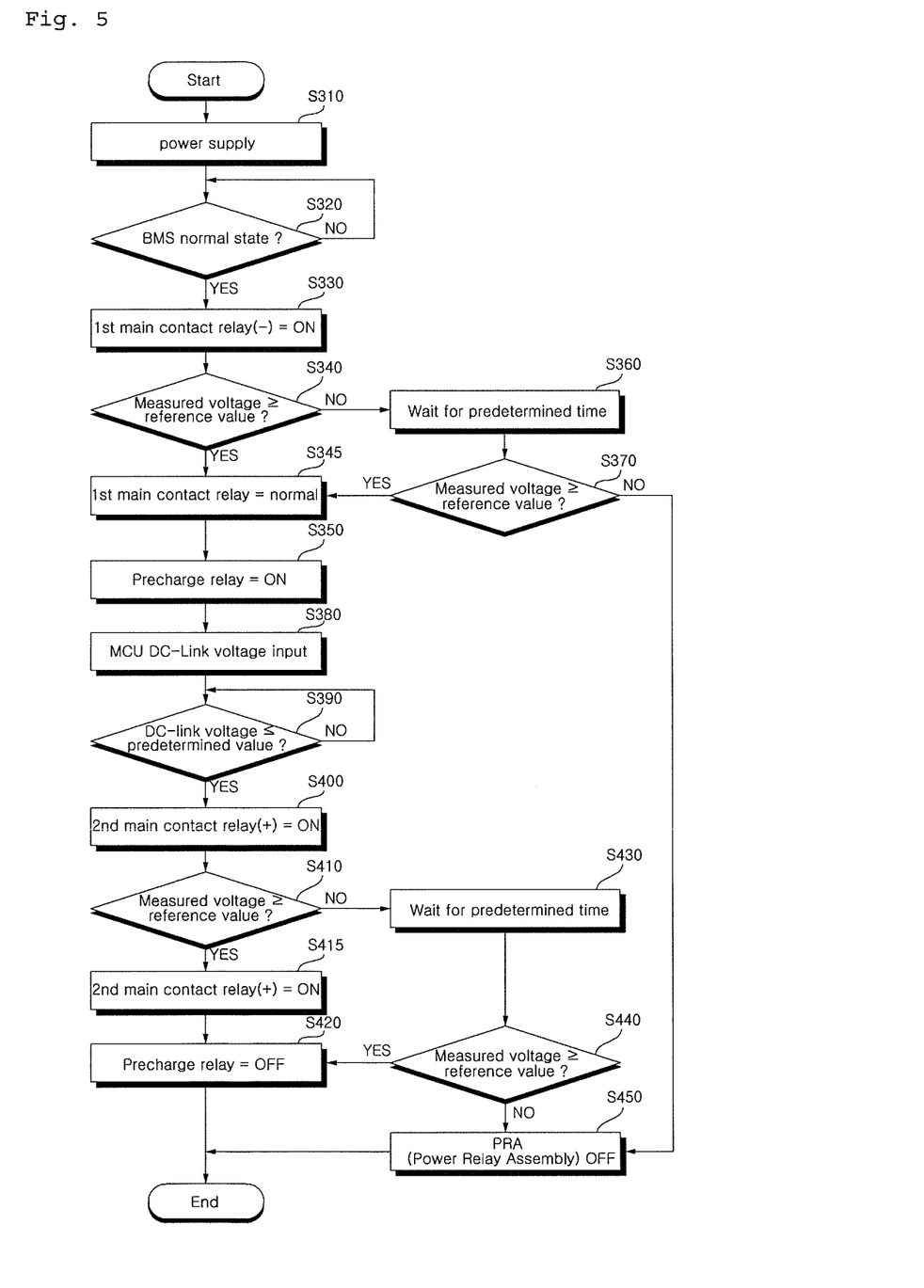
FIG. 5 is a flowchart illustrating a method for supplying power to the electric vehicle according to an embodiment of the present invention.

In order to start driving the electric vehicle, a method for supplying power to the electric vehicle will hereinafter be described with reference to FIG. 5. FIG. 5 is a flowchart illustrating a method for supplying power to the electric vehicle according to an embodiment of the present invention.

Referring to FIG. 5, if a start ON signal is input to the electric vehicle in step S310, the VCM 110 outputs the start ON signal to individual components of the vehicle, and determines whether the BMS 120 normally operates in step S320. In this case, if the BMS 120 normally operates, or if the BMS 120 is in the second, third, or fourth step, it is determined that the electric vehicle is in a normal state.

If the BMS 120 is in a normal state, the VCM 110 outputs a signal to the first main contact relay(−) 143, such that the first main contact relay(−) 143 is turned on in step S330.

If the first main contact relay(−) 143 is turned on, a negative (−) terminal of the battery 130 is connected to the MCU 150, so that a current flows in the electric vehicle.

The VCM 110 persistently receives a current value measured by the current sensor 144 disposed between the battery 130 and the first main contact relay(−) 143.

In addition, the VCM 110 is connected to the first main contact relay 143. If the first main contact relay 143 is turned on, the VCM 110 receives a voltage value applied to the first main contact relay 143 through the first connection line.

After the VCM 110 controls the first main contact relay 143 to be turned on, the VCM 110 determines whether the first main contact relay 143 is actually turned on and normally operates. In this case, the VCM 110 determines whether a voltage value measured by the first connection line is equal to or higher than a reference value in step S340, so that it is determined whether the voltage value is at a logic high or low level. Preferably, the voltage may be in the range of 2V~4V.

If the voltage value is equal to or higher than a reference value, i.e., if the voltage value is set to 5V, the VCM 110 determines that the first main contact relay 143 is turned on so that the electric vehicle normally operates in step S345.

Since the first main contact relay 143 is turned on, the VCM 110 determines that the vehicle normally operates in step S345.

If the first main contact relay 143 normally operates the VCM 110 outputs a switching signal to the precharge relay 141, such that the precharge relay 141 is turned on in step S350.

On the other hand, if the voltage value is lower than a reference value, the VCM 110 waits for a predetermined time in step S360, and re-compares a voltage value with the reference value in step S370. In this case, if the voltage value is equal to or higher than the reference value in step S370, this means that the first main contact relay 143 normally operates in step S345, such that the precharge relay 141 is turned on in step S350.

If the voltage value measured after a predetermined time is lower than the reference value, the PRA is turned off in step S450.

If the precharge relay 141 is turned on, the positive(+) terminal of the battery 130 is connected to the MCU 150 through the precharge relay 141, and the operating power of the battery 130 is applied to each component of the vehicle. However, the precharge relay 141 is connected to a predetermined-sized resistor, such that the magnitude of a current is reduced according to a resistance value of the resistor.

The VCM 110 receives a voltage of a DC-link contained in the MCU 150 from the MCU 150 in step S380. The VCM 110 determines whether a DC-link voltage received from the MCU 150 is equal to or higher than a predetermined value. If the DC-link voltage is equal to or higher than the predetermined value, the VCM 110 outputs a signal to the second main contact relay(+) 142, such that the second main contact relay(+) 142 is turned on in step S400.

If the second main contact relay(+) 142 is turned on, a current flowing through the precharge relay 141 can flow in the second main contact relay(+) 142 having low resistance.

The VCM 110 recognizes a voltage value received through the second connection line as a voltage applied to the second main contact relay(+) 142, and determines whether the second main contact relay 142 normally operates.

In this case, the VCM 110 determines whether the voltage value is equal to or higher than the reference value in step S410. If the voltage value is equal to or higher than the reference value, this means that the second main contact relay 142 is turned on such that it normally operates in step S415. Thereafter, the VCM 110 outputs a signal to the precharge relay 141 such that the precharge relay 141 is turned off in step S420.

Meanwhile, if a voltage applied to the second main contact relay(+) 142 (i.e., a voltage applied to the VCM 110 through a second connection line) is less than a reference value, the VCM 110 waits for a predetermined time in step S430, and re-measures the voltage value so as to re-determine whether a current value is higher than the reference value in step S440. In this case, the reference value may be in the range of 2V~4V.

Here, if the voltage value is equal to or higher than the reference value, the VCM 110 controls the precharge relay 141 to be turned off in step S420. After lapse of a predetermined time, if the measured voltage value is lower than the reference value, the PRA 140 is turned off in step S450.

In this case, the VCM 110 turns off the PRAM 140 and outputs an error message.

As described above, when the vehicle starts driving, the VCM 110 sequentially drives the relays, controls the relays, and checks operation states of the relays, such that it can provide a high-voltage power source to the vehicle, resulting in prevention of problems caused by a suddenly-generated high-voltage.

Figure 6:
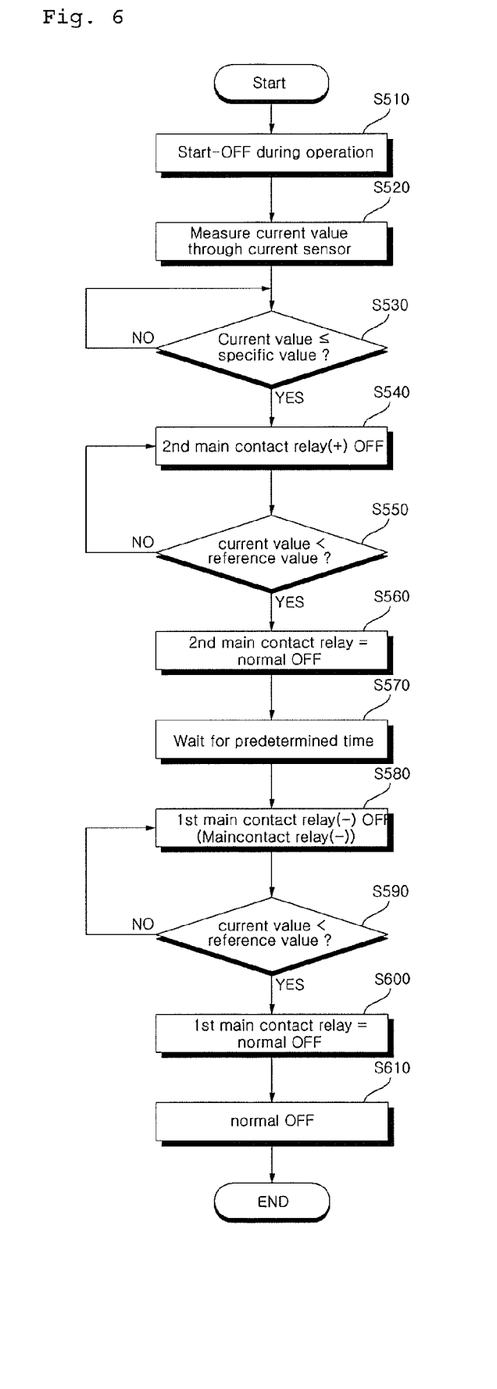
FIG. 6 is a flowchart illustrating a method for cutting off power supplied to the electric vehicle when the electric vehicle stops according to an embodiment of the present invention.

FIG. 6 is a flowchart illustrating a method for cutting off power supplied to the electric vehicle when the electric vehicle stops according to an embodiment of the present invention. Referring to FIG. 6, if the vehicle stops operation, i.e., if a start-OFF signal is input to the electric vehicle in step S510, the start-OFF signal is applied to individual components of the vehicle.

If the start-OFF signal is applied to the vehicle, the VCM 110 measures a current value using the current sensor 144, and the current sensor 144 outputs the measured current value to the VCM 110 in step S520.

The VCM 110 determines whether a current value detected by the current sensor 144 is less than a specific value (for example, 1 A) in step S530.

In this case, the start-OFF signal is applied to individual components by the VCM 110, so that the individual components stop operation. It takes a predetermined time to stop each component, such that it is preferable that the VCM 110 be in a standby mode, instead of immediately powering off the PRA 140.

Therefore, the VCM 110 receives a value of a current flowing in the second main contact relay(+) 142 through the current sensor 144. If the current value is equal to or less than a specific value, the VCM 110 outputs a signal to the second main contact relay(+) 142 so that the second main contact relay(+) is turned off in step S540.

If the second main contact relay(+) 142 is turned off, the positive(+) terminal of the battery 130 is disconnected from the MCU 150.

In order to check whether the second main contact relay 142 is normally turned off under the above-mentioned OFF control, the VCM 110 compares a voltage value of a second connection line connected to the second main contact relay 142 with a predetermined reference value in step S550.

In this case, if the voltage value is less than the reference value, it is determined that the second main contact relay 142 is normally turned off in step S560. If the voltage value is equal to or higher than the reference value, this means that the second main contact relay 142 is still turned on so that the VCM 110 controls the second main contact relay 142 to be turned off in step S540. The VCM 110 waits for a predetermined time after the second main contact relay(+) 142 has been turned off, and outputs a signal to the first main contact relay(−) 143 such that the first main contact relay(−) 143 is turned off in step S580.

In this case, although the predetermined time serving as a standby time is exemplarily set to about 56 ms for convenience of description, it should be noted that different times may also be used according to circuit configuration and electrical capacity of individual components.

The VCM 110 measures a voltage of the first connection line connected to the first main contact relay 143, and determines whether the measured voltage value is less than a reference value in step S590. If the measured voltage value is less than the reference value in step S590, the VCM 110 determines that the first main contact relay 143 was normally turned off in step S600.

Therefore, starting the electric vehicle is completely terminated such that the electric vehicle stops moving in step S610.

As described above, when the electric vehicle stops driving, the embodiment does not immediately cut off a high-voltage power source supplied to the electric vehicle, and cuts off the high-voltage power source after lapse of a predetermined standby time during which each additional operation stops, thereby preventing electronic components from being damaged by sudden power interruption.

Figure 7:
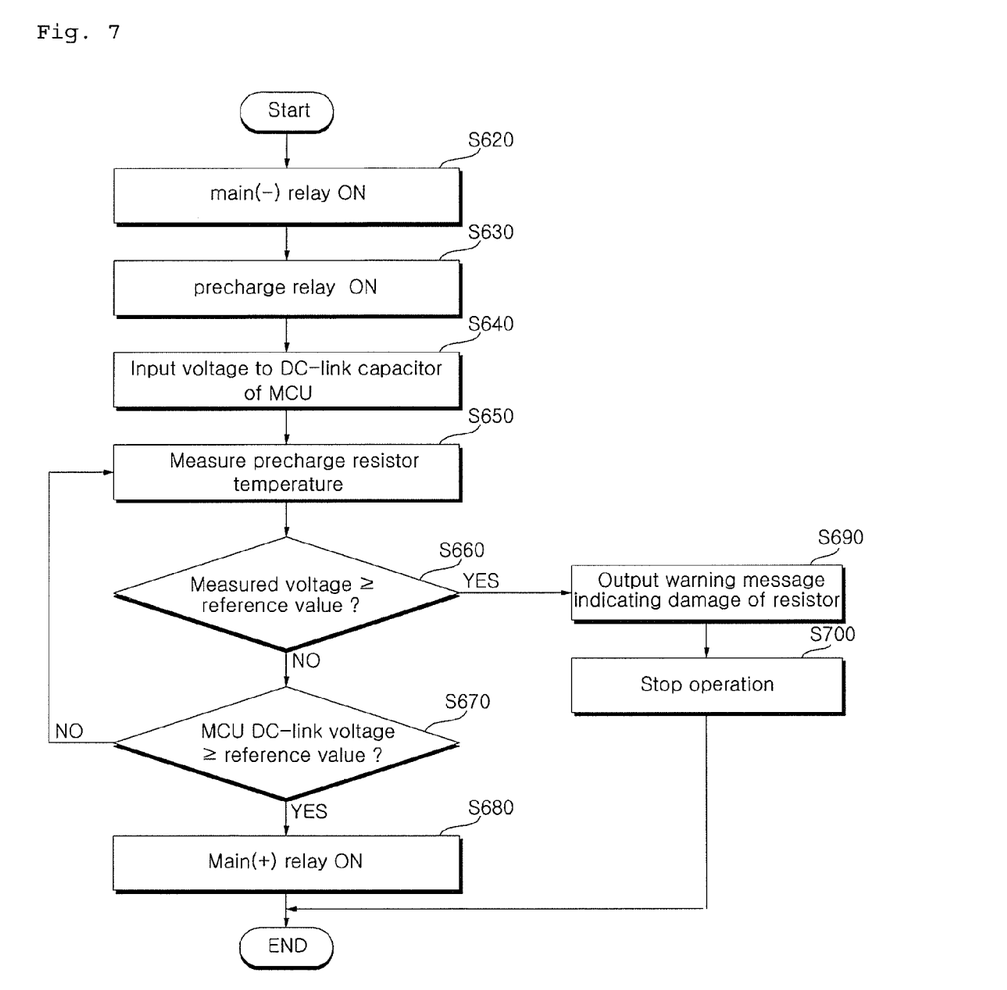
FIG. 7 is a flowchart illustrating a method for monitoring and controlling a power relay assembly (PRA) according to an embodiment of the present invention.

FIG. 7 is a flowchart illustrating a method for monitoring and controlling a power relay assembly (PRA) according to an embodiment of the present invention.

Referring to FIG. 7, when the electric vehicle starts, the VCM 110 must provide power charged in the battery 130 to the vehicle. In this case, the VCM 110 outputs a control signal for sequentially operating a plurality of relays contained in the PRA 140 to each relay.

If the VCM 110 outputs a signal to the first main contact relay(−) 143 of the PRA 140, the first main contact rely(−) 143 is switched on in step S620.

If the first main contact relay(−) 143 is switched on, the negative(−) terminal of the battery 130 is connected to the MCU 150. In this case, the VCM 110 persistently receives a current value measured by the current sensor 144 disposed between the battery 130 and the first main contact relay(−) 143.

If the first main contact relay 143 is turned on and normally operates, the VCM 110 outputs a switching control signal to the precharge relay 141. As a result, the precharge relay 141 is turned on in step S630.

In this case, if the precharge relay1 141 is turned on, the positive(+) terminal of the battery 130 is connected to the MCU 150 through the precharge relay 141.

If the precharge relay 141 is turned on, the operation power of the battery 130 is supplied to the MCU 150 such that a voltage is applied to a capacitor of the DC link terminal 151 of the MCU 150 in step S640. In addition, the operating power of the battery 130 is applied to each part.

However, the precharge relay 141 is connected in series to the precharge resistor 145, and a voltage or current is reduced according to a resistance value of the resistor 145 such that the resultant voltage or current is applied to the electric vehicle.

If the precharge relay 141 is turned on, a voltage is applied to the precharge resistor 145 such that a temperature of the precharge resistor 145 increases.

The resistor temperature sensor 171 of the precharge resistor 145 measures a surface temperature of the precharge resistor 145, and outputs the measured temperature to the controller in step S650.

The controller 110 compares the temperature measured by the resistor temperature sensor 171 with a predetermined reference temperature, and determines a state of the precharge relay 141 in step S660.

In this case, the reference temperature is a reference for determining whether the precharge relay 141 is damaged. Since the precharge resistor is damaged at a predetermined temperature or higher, a first resistor via which the same overcurrent flows when the relay is damaged by overcurrent is also damaged, such that it is determined whether the precharge relay 141 is damaged on the basis of the possibility of damaging the precharge resistor.

Preferably, the reference temperature may be set to a temperature lower than that of the precharge resistor at a start time at which damage starts, on the basis of a specific time at which the precharge relay 141 or the precharge resistor 145 starts to be damaged by overcurrent.

If the measured temperature is equal to or higher than the reference temperature, the VCM 110 determines that the precharge resistor 145 or the precharge relay 141 is damaged, and outputs a warning message in step S690. Thereafter, the VCM 110 determines that power is abnormally provided to the electric vehicle such that the electric vehicle stops operation in step S700.

If the measured temperature is less than the reference temperature, the VCM 110 determines that the precharge resistor and the precharge relay 141 are normally operated, so that it receives a voltage applied to a DC link and compares the received voltage with a reference value in step S670.

If the voltage supplied to the MCU 150 is less than the reference value in step S670, the VCM 110 waits for a predetermined time until the voltage value is equal to or higher than the reference value. In this case, the VCM 110 persistently receives a temperature value of the precharge resistor 145 from the resistor temperature sensor 171, and compares the received temperature with a reference temperature in steps S650 and S660.

If a measurement temperature of the precharge resistor 145 is equal to or higher than the reference temperature before a voltage supplied to the MCU 150 reaches the reference value, the VCM 119 determines that the precharge resistor 145 or the precharge relay 141 is damaged, outputs a warning message in step S690 and determines that power is abnormally supplied to the vehicle such that the vehicle stops moving in step S700.

If a measurement temperature of the precharge resistor 145 is less than the reference temperature and a voltage of the DC link terminal 151 of the MCU 150 is equal to or higher than the reference value, the VCM 110 outputs a control signal to the second main contact relay(+) 142 such that the second main contact relay 142 is turned on in step S680.

The precharge relay 141 is connected in parallel to the second main contact relay 142. If the second main contact relay(+) 142 is turned on, current flowing in the precharge relay 141 flows through the second main contact relay(+) 142 having a low resistance.

If the second main contact relay 142 normally operates, the VCM 110 turns off the precharge relay 141.

Therefore, power of the battery 130 is normally supplied to each part such that the electric vehicle can normally operate. A plurality of relays of the PRA are sequentially turned off when the electric vehicle stops moving, power supply of the battery 130 is cut off.

Therefore, the electric vehicle according to the present invention monitors a state of the PRA 140 (specifically, a state indicating whether the precharge relay is damaged) when power is supplied to the battery 130, on the basis of a temperature value of a precharge resistor connected to the precharge relay, such that it is determined whether the precharge relay or the precharge resistor is damaged.

Therefore, although a fault or malfunction occurs in the electric vehicle because of the occurrence of overcurrent generated prior to starting normal power supply, constituent components such as an MCU are prevented from being damaged, such that high-voltage power for the electric vehicle can be stably provided or cut off.

Figure 8:
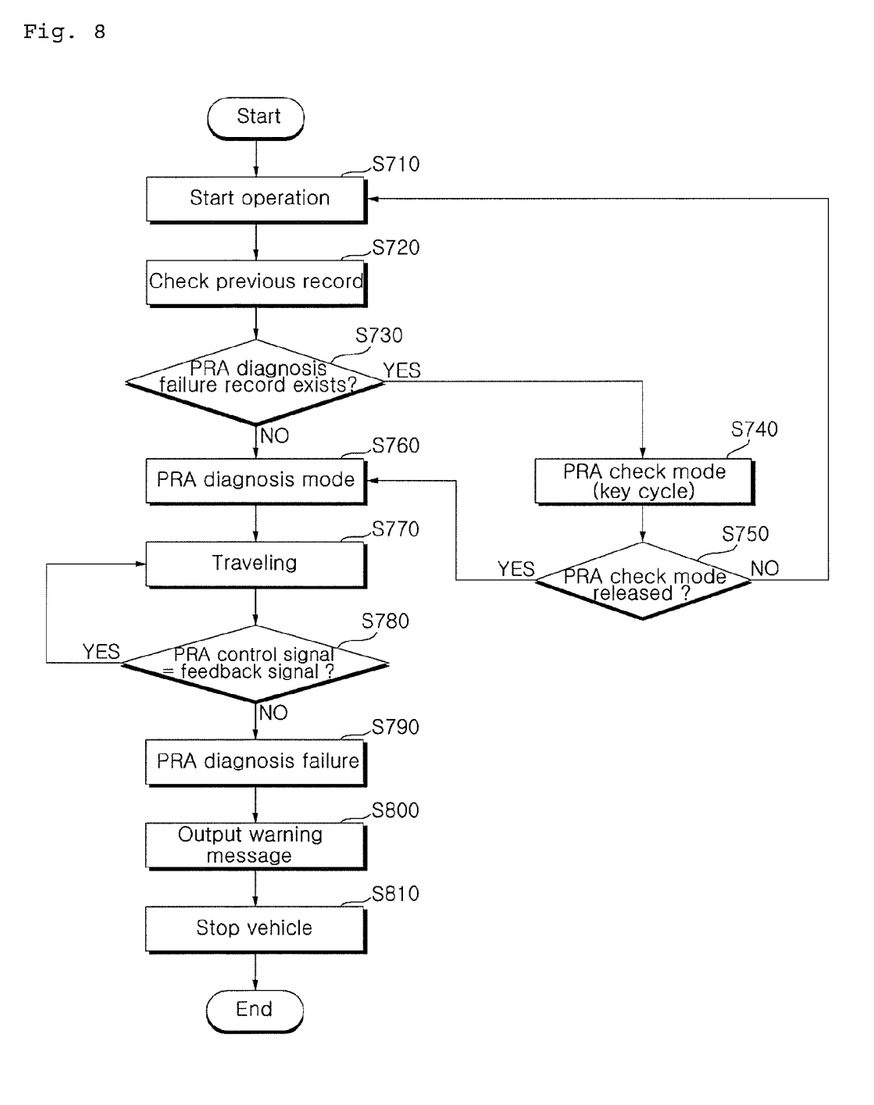
FIG. 8 is a flowchart illustrating a method for monitoring switching control of the electric vehicle according to an embodiment of the present invention.

FIG. 8 is a flowchart illustrating a method for monitoring switching control of the electric vehicle according to an embodiment of the present invention.

Referring to FIG. 8, if the electric vehicle starts driving in step S710, the VCM 110 checks and confirms a pre-stored traveling record in step S720. The VCM 110 determines, on the basis of the traveling record, whether a failure has occurred in PRA diagnosis in the previous traveling action in step S730.

If there is no PRA diagnosis failure in the previous traveling action, the VCM 110 establishes a PRA diagnosis mode in step S760, such that the vehicle can be normally driven in step S770.

In case of the PRA diagnosis mode, the vehicle runs on the assumption that the relays of the PRA 140 are normally operated, a control signal of the VCM 110 is compared with a feedback signal of the PRA 140 during the vehicle traveling, and it is determined whether the control signal of the VCM 110 is identical to the feedback signal, such that the PRA diagnosis mode can determine the presence or absence of abnormal relay switching according to the result of comparison.

On the other hand, if there is a PRA diagnosis failure, the VCM 110 releases the PRA diagnosis mode, and establishes a PRA check mode in step S740.

In case of the PRA check mode, the VCM 110 can determine whether switching control of a plurality of relays contained in the PRA 140 is normally carried out. The VCM 110 repeatedly performs key cycling in which the relays are tested and starting-OFF and restarting of the vehicle are performed, such that the PRA check mode is maintained.

When testing the relays, if it is determined that the relays of the PRA 140 are normally operated, the VCM 110 releases the PRA check mode in step S750. If the relays of the PRA 140 are abnormally operated, starting-OFF and restarting of the vehicle are repeated to maintain the PRA check mode as described above, and these operations are repeated until the PRA check mode is released in steps S740 and S750.

If the relays of the PRA 140 are normally operated, the VCM 110 releases the PRA check mode and establishes the PRA diagnosis mode in step S760.

If the PRA diagnosis mode is established, the VCM 110 persistently compares a control signal applied to the PRA 140 with a feedback signal received from the PRA 140 such that it determines whether the two signals are identical to each other in step S780.

If the control signal is identical to the feedback signal, the VCM 110 maintains normal traveling of the vehicle and persistently performs comparison between the control signal and the feedback signal until the vehicle driving stops in steps S770 and S780.

In the meantime, if the control signal is not identical to the feedback signal during the PRA diagnosis mode, the VCM 110 determines the occurrence of PRA diagnosis failure in step S790, and outputs a warning message in step S800. If the relays of the PRA 140 are not normally switched, this means that a malfunction occurs in power supply of the vehicle so that the vehicle stops moving in step S810.

In this case, the VCM 110 stores a record caused by the PRA diagnosis failure in the traveling record.

Figure 9:
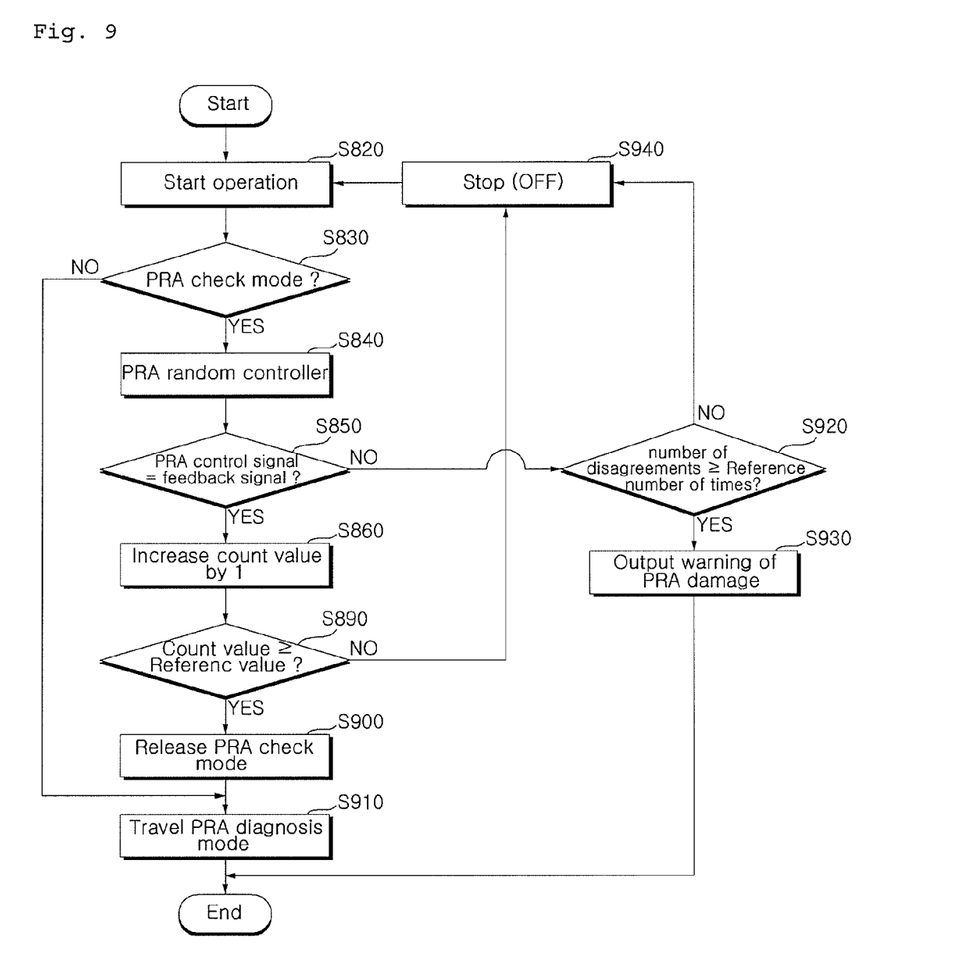
FIG. 9 is a flowchart illustrating a method for diagnosing whether a power relay assembly (PRA) of the electric vehicle is damaged.

FIG. 9 is a flowchart illustrating a method for diagnosing whether a power relay assembly (PRA) of the electric vehicle is damaged.

As described above, if the electric vehicle starts, the VCM 110 checks a record of the PRA diagnosis failure on the basis of the traveling record. In this case, if there is a record of the PRA diagnosis failure, the VCM 110 establishes a PRA check mode, and repeatedly performs starting-OFF and restarting of the vehicle until the PRA check mode is released, resulting in implementation of PRA testing.

Referring to FIG. 9, when the electric vehicle starts driving in step S820, the VCM 110 determines whether a current mode is a PRA check mode or a PRA diagnosis mode in step S830. If the PRA check mode is established, the VCM 110 starts random control of the PRA 140 in step S840.

In this case, the VCM 110 determines the presence of a malfunction in switching control of the relays of the PRA on the condition that the PRA check mode is established, such that the electric vehicle does not start operation and performs random control to check switching control of the relays of the PRA 140.

The VCM 110 can output a predetermined warning message for the PRA check mode through the interface unit 180.

The VCM 110 outputs a random control signal to the PRA 140 irrespective of vehicle travelling, and controls the PRA 140 to switch the relays in response to the control signal. In addition, a feedback signal from each switched relay is input to the VCM 110.

In this case, the VCM 110 compares the control signal applied to the PRA 140 with a feedback signal received from the PRA 140, and determines whether the control signal is identical to the feedback signal in step S850.

If the control signal is identical to the feedback signal according to the determination result, the VCM 110 increases a count value for releasing the PRA check mode by one in step S860.

In association with the increased count value for mode release, the VCM 110 determines whether the count value is equal to or higher than a reference value in step S890.

Although the count value increases because the control signal is identical to the feedback signal, if the count value is less than a reference value, the VCM 110 maintains the PRA check mode, stops driving the vehicle in step S940, and restarts the vehicle in step S820.

If the electric vehicle restarts driving, the VCM 110 outputs an arbitrary control signal to the PRA 140, and compares the control signal with the feedback signal. If the control signal is identical to the feedback signal, the count value is increased and then compared with a reference value in steps S820 to S890.

If the above-mentioned steps are repeated a predetermined number of times or higher, the VCM 110 releases the PRA check mode in step S900.

If the PRA check mode is released, the VCM 110 establishes the PRA diagnostic mode, and monitors switching control of the PRA simultaneously while performing normal vehicle traveling in step S910. If necessary, the VCM 110 may restart driving the electric vehicle, and enter the PRA diagnostic mode.

Meanwhile, the VCM 110 outputs a random control signal to the PRA 140. If the control signal is different from the feedback signal, the VCM 110 counts how many times the control signal is not identical to the feedback signal.

The VCM 110 determines if the number of disagreements between the control signal and the feedback signal is equal to or higher than a reference number of times in step S920. If the number of disagreements between the control signal and the feedback signal is less than a reference number of times in step S920, the VCM 110 maintains the PRA check mode, stops driving the vehicle in step S940, restarts driving the vehicle in step S920, and re-compares the control signal with the feedback signal in steps S830 to S850.

By repeating the above-mentioned steps, if the number of disagreements between the control signal and the feedback signal is equal to or higher than the reference number of times in step S920, The VCM 110 determines that the PRA 140 is damaged or has malfunctioned, so that it outputs a warning message indicating that it is impossible to repair the PRA 140 such that vehicle traveling is impossible in step S930.

Namely, during the PRA check mode, the VCM 110 performs random control of the PRA and repeatedly compares the control signal with the feedback signal. Although PRA switching control of the electric vehicle is normally operated only once, the VCM 110 rechecks how many times PRA switching control is normally operated. If the number of the counted normal PRA switching control times is equal to or higher than the reference value, this means that the PRA 140 is normally operated, such that the PRA check mode is released and normal traveling of the vehicle is achieved.

In addition, although the control signal is not identical to the feedback signal in the PRA check mode, the VCM 110 determines the occurrence of a malfunction in the PRAN only when the number of disagreements between the control signal and the feedback signal is equal to or higher than a predetermined number of times.

The electric vehicle according to the embodiment of the present invention compares a control signal with a feedback signal during vehicle traveling, and persistently monitors the PRA switching control state. If the control signal is not identical to the feedback signal, the electric vehicle performs the PRA check mode for testing the PRA state, such that the PRA switching operation can be accurately diagnosed.

Since an unexpected problem occurs in power supply of the electric vehicle because of an abnormal PRA state, the electric vehicle performs correct switching control of the PRA by monitoring a PRA state, and stably receives a power-supply voltage by diagnosing the PRA state. Although a malfunction occurs in the electric vehicle, the electric vehicle can recognize the cause of the malfunction.

As is apparent from the above description, the electric vehicle according to the embodiments checks an operation state of each relay, and solves problems generated when high-voltage power for the electric vehicle is abruptly supplied or cut off, such that the electric vehicle can be more stably started or stopped.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An electric vehicle comprising:
   a battery for charging a high-voltage operating power therein, and providing the charged power;
   a battery management system (BMS) for managing a state of the battery in response to the charging of the battery or the operating power supplied from the battery;
   a motor control unit (MCU) for controlling a motor;
   a power relay assembly (PRA) including a plurality of relays and resistors, configured to perform switching of the relays in such a manner that the operating power of the battery is supplied to the vehicle according to whether the plurality of relays is operated; and
   a vehicle control module (VCM) for stepwise-operating the plurality of relays contained in the power relay assembly (PRA) in response to a state of the power relay assembly (PRA) and sensed data, controlling supply of the operating power from the battery, controlling vehicle traveling using the operating power, and checking an operation state of the plurality of relays,
   wherein the power relay assembly (PRA) includes:
      a first main contact relay(+) connected to a negative(-) terminal of the battery and the motor control unit (MCU);
      a second main contact relay(-) connected to a positive (+) terminal of the battery and the motor control unit (MCU);
      a precharge relay connected in parallel to the second main contact relay;
      a precharge resistor connected in series to the precharge relay; and
      a current sensor for measuring a current flowing in the first or second main contact relay, and applying the measured current to the vehicle control module (VCM),
   wherein:
      the vehicle control module (VCM), after completion of an operation, if a current value detected by the current sensor is equal to or less than a specific value, turns off the second main contact relay; and
      the vehicle control module (VCM), if a voltage value of a second connection line connected to the second main contact relay is less than a predetermined reference value, determines that the second main contact relay is normally turned off.

2. The electric vehicle according to claim 1, wherein the vehicle control module (VCM), if the battery management system (BMS) is in a normal state when the vehicle starts driving, controls the first main contact relay to be operated, and controls the precharge relay to be operated if the first main contact relay normally operates.

3. The electric vehicle according to claim 2, wherein the vehicle control module (VCM) controls the first main contact relay, recognizes a voltage value of a first connection line connected to the first main contact relay as a voltage applied to the first main contact relay, and if the voltage value is equal to or higher than the reference value, determines that the first main contact relay is turned on and normally operates.

4. The electric vehicle according to claim 1, wherein the vehicle control module (VCM) first inputs a current to the precharge relay connected to the precharge resistor from among the precharge relay and the second main contact relay connected in parallel, and controls, if the second main contact relay normally operates, the precharge relay to be turned off.

5. The electric vehicle according to claim 4, wherein:
   the vehicle control module (VCM), if the operating power of the battery is applied to the motor control unit (MCU) according to an operation of the precharge relay, controls the second main contact relay to be operated in response to the magnitude of a voltage of a DC link of the motor control unit (MCU); and
   the vehicle control module (VCM) recognizes a voltage value of a second connection line configured to receive a voltage when the second main contact relay is operated, as a voltage of the second main contact relay, and determines that the second main contact relay is turned on and normally operates when the voltage value is equal to or higher than the predetermined reference value, thereby turning off the precharge relay.

6. The electric vehicle according to claim 1, wherein the vehicle control module (VCM), if the second main contact relay is turned off, turns off the first main contact relay after a predetermined time and, if a voltage value of a first connection line connected to the first main contact relay is less than the reference value, determines that the first contact relay is normally turned off.

7. The electric vehicle according to claim 1, further comprising:
   a resistor temperature sensor installed in the power relay assembly (PRA) and configured to measure a temperature of the precharge resistor,
   wherein the vehicle control module (VCM) monitors whether the power relay assembly (PRA) is damaged on the basis of a measurement temperature received from the resistor temperature sensor, and supplies the operating power of a normal voltage from the battery to the motor control unit (MCU) when the power relay assembly (PRA) is in a normal state
   wherein the vehicle control module (VCM) supplies power of a reduced voltage to the motor control unit (MCU) by operating the precharge relay and, if a temperature of the precharge resistor measured by the resistor temperature sensor is equal to or higher than the reference temperature, determines that at least one of the precharge resistor and the precharge relay is damaged and outputs a warning message indicating a damaged state, and
   wherein the vehicle control module (VCM), if the temperature of the precharge resistor is less than the reference temperature and a voltage applied to the motor control unit (MCU) is equal to or higher than a reference value, operates the second main contact relay, and supplies the operating power of a normal voltage to the vehicle.

8. The electric vehicle according to claim 7, wherein the resistor temperature sensor is installed at a surface of the precharge resistor, so as to measure a temperature of the precharge resistor.

9. The electric vehicle according to claim 7, wherein the vehicle control module (VCM), if a voltage value applied to the motor control unit (MCU) is less than the reference value, persistently receives a temperature of the precharge resistor from the resistor temperature sensor until the voltage applied to the motor control unit (MCU) reaches the reference value, and compares the received temperature with the reference temperature.

10. The electric vehicle according to claim 9, wherein the vehicle control module (VCM), if a measurement temperature of the resistor temperature sensor is equal to or higher than the reference temperature before a voltage applied to the motor control unit (MCU) reaches the reference value, determines that the precharge resistor or the precharge relay is damaged, outputs a warning message indicating a damaged state, and thus stops operation.

11. An electric vehicle comprising:
a battery for charging a high-voltage operating power therein, and providing the charged power;
a power relay assembly (PRA) including a plurality of relays, configured to perform switching of the relays in such a manner that the operating power of the battery is supplied to the vehicle according to whether the plurality of relays is operated; and
a vehicle control module (VCM) for controlling vehicle traveling, persistently determining whether the plurality of relays contained in the power relay assembly (PRA) is normally operated through a PRA diagnostic mode during the vehicle traveling, performing a PRA check mode when at least one of the plurality of relays is operated, and diagnosing a state of the power relay assembly (PRA) by testing the plurality of relays of the power relay assembly (PRA),
wherein the vehicle control module (VCM), if the PRA diagnostic mode is established, compares a control signal applied to the power relay assembly (PRA) with a feedback signal received from the power relay assembly (PRA), determines whether the plurality of relays contained in the power relay assembly (PRA) is normally operated according to the comparison result, and stores a message indicating PRA diagnosis failure in a traveling record if the control signal is not identical to the feedback signal.

12. The electric vehicle according to claim 11, wherein the vehicle control module (VCM), if the vehicle starts driving, first determines the presence or absence of the PRA diagnosis failure record in previous traveling, allows the vehicle to perform normal traveling in the PRA diagnostic mode if the absence of the PRA diagnosis failure record is determined, and executes the PRA check mode if the presence of the PRA diagnosis failure record is determined.

13. The electric vehicle according to claim 11, wherein the vehicle control module (VCM), if the PRA check mode is established, outputs an arbitrary control signal to the power relay assembly (PRA), compares the arbitrary control signal with a feedback signal received from the power relay assembly (PRA) and, if the arbitrary control signal is adjusted to be identical to the feedback signal a predetermined number of times or higher, determines that the power relay assembly (PRA) normally operates and releases the PRA check mode.

14. The electric vehicle according to claim 13, wherein:
the vehicle control module (VCM), in the PRA check mode, repeatedly stops and restarts the vehicle, and diagnoses a state of the power relay assembly (PRA) by comparing the arbitrary control signal with the feedback signal,
the vehicle control module (VCM) maintains the PRA check mode until the power relay assembly (PRA) normally operates in such a manner that limited traveling of the vehicle is achieved; and
the vehicle control module (VCM), if the number of disagreements between the arbitrary control signal and the feedback signal is equal to or higher than a predetermined number of times, diagnoses damage of the power relay assembly (PRA) and outputs a warning message indicating the damaged state.

15. A method for operating an electric vehicle comprising:
operating, by a vehicle control module (VCM), if the vehicle starts driving, a first main contact relay contained in a power relay assembly (PRA) in response to state information of a battery management system (BMS), and connecting the battery and a negative(−) terminal of a motor control unit (MCU);
if the first main contact relay normally operates, operating a precharge relay connected to a positive(+) terminal of the battery, and connecting the battery to a positive(+) terminal of the motor control unit (MCU) through a predetermined-sized precharge resistor;
if a voltage received from the motor control unit (MCU) is equal to or higher than a predetermined voltage value, operating the second main contact relay connected in parallel to the precharge relay, and connecting the battery to the motor control unit (MCU) through a second main contact relay;
if the second main contact relay normally operates, finally connecting the battery to the motor control unit (MCU) by turning off the precharge relay; and
performing re-determination after lapse of a predetermined standby time, if the first main contact relay or the second main contact relay does not normally operate; and turning off the power relay assembly (PRA) and outputting an error message, if the first main contact relay or the second main contact relay does not normally operate during the re-determination.

16. The method according to claim 15, further comprising:
if a voltage applied to a first connection line, via which the first main contact relay is connected to the vehicle control module (VCM), is equal to or higher than a predetermined reference value, determining that the first main contact relay is turned on and normally operates; and
if a voltage applied to a second connection line via which the second main contact relay is connected to the vehicle control module (VCM) is equal to or higher than a predetermined reference value, determining that the first main contact relay is turned on and normally operates.

17. The method according to claim 15, further comprising:
if the vehicle stops driving, turning off the second contact relay in response to a current value measured by the power relay assembly (PRA) and, if the second contact relay is normally turned off, turning off the first contact relay after a predetermined time.

18. A method for controlling an electric vehicle comprising:
sequentially operating a plurality of relays contained in a power relay assembly (PRA) interconnecting a battery and a motor control unit (MCU) so as to provide an operating power;

providing the operating power having a voltage reduced by a precharge resistor contained in the power relay assembly (PRA) to the motor control unit (MCU);

monitoring whether the power relay assembly (PRA) is damaged by measuring a temperature of the precharge resistor through a resistor temperature sensor;

if the power relay assembly (PRA) normally operates, supplying the operating power of a normal voltage from the battery to the motor control unit (MCU);

if a measurement temperature of the resistor temperature sensor is less than a reference temperature, determining that the power relay assembly (PRA) is in a normal state;

measuring a voltage applied to the motor control unit (MCU), and supplying the operating power of a normal voltage from the battery to the motor control unit (MCU) if the voltage value is equal to or higher than a reference value, and if the voltage value applied to the motor control unit (MCU) is less than the reference value, persistently receiving a measurement temperature of the precharge resistor from the resistor temperature sensor until the voltage value reaches the reference value, and monitoring a state of the power relay assembly (PRA) on the basis of the received measurement temperature.

19. The method according to claim 18, further comprising:

if a measurement temperature of the resistor temperature sensor installed at a surface of the precharge resistor is equal to or higher than a reference temperature, determining that the power relay assembly (PRA) is damaged, outputting a warning message indicating a damage state, and stopping the vehicle.

20. The method according to claim 18, further comprising:

if the measurement temperature of the resistor temperature sensor is equal to or higher than the reference temperature before a voltage value applied to the motor control unit (MCU) reaches the reference value, determining that the power relay assembly (PRA) is damaged, outputting a warning message indicating a damaged state, and stopping the vehicle.

21. A method for controlling an electric vehicle comprising: checking a pre-stored traveling record when the vehicle starts driving;

if a power relay assembly (PRA) diagnosis failure record does not exist in the traveling record, establishing a PRA diagnostic mode, performing normal traveling of the vehicle while simultaneously monitoring a state of the power relay assembly (PRA), and storing a monitoring result of the power relay assembly (PRA) state in the traveling record;

if the PRA diagnosis failure record exists in the traveling record, establishing a power relay assembly (PRA) check mode to check a state of a plurality of relays contained in the power relay assembly (PRA) as well as to determine the presence or absence of a malfunction in the relays, thereby diagnosing the PRA state; and if the PRA diagnostic mode is established, applying a control signal to the power relay assembly (PRA) so as to supply or cut off power, receiving a feedback signal from the power relay assembly (PRA) operating in response to the control signal, comparing the control signal with the feedback signal to determine whether the control signal is identical to the feedback signal, and monitoring the PRA state.

22. The method according to claim 21, further comprising:

if the PRA diagnostic mode is established, maintaining vehicle traveling if the control signal is identical to the feedback signal, outputting a warning message if the control signal is different from the feedback signal, stopping vehicle traveling, and storing a message of a PRA diagnosis failure in the traveling record.

23. The method according to claim 21, further comprising:

if the PRA check mode is established, repeating stopping and restarting of the vehicle, applying an arbitrary control signal to the power relay assembly (PRA), receiving a feedback signal for the arbitrary control signal, and comparing the control signal with the feedback signal;

if the number of disagreements between the control signal and the feedback signal is equal to or higher than a predetermined number of times, diagnosing that the power relay assembly (PRA) is damaged, and outputting a warning message; and increasing a count value for mode release if the control signal is identical to the feedback signal, and releasing the PRA check mode if the count value of the mode release is equal to or higher than a predetermined value.

* * * * *